United States Patent
McKee (10) Patent No.: US 12,523,817 B2
(45) Date of Patent: Jan. 13, 2026

(54) PHOTONIC DEVICE WITH FIDUCIAL MARKS FOR ALIGNMENT OF AN OPTICAL COMPONENT

(71) Applicant: SIVERS PHOTONICS LIMITED, Glasgow (GB)

(72) Inventor: Andrew McKee, Glasgow (GB)

(73) Assignee: SIVERS PHOTONICS LIMITED, Glasgow (GB)

( * ) Notice: Subject to any disclaimer, the term of this patent is extended or adjusted under 35 U.S.C. 154(b) by 241 days.

(21) Appl. No.: 18/280,239

(22) PCT Filed: Mar. 4, 2022

(86) PCT No.: PCT/GB2022/050583
§ 371 (c)(1),
(2) Date: Sep. 3, 2023

(87) PCT Pub. No.: WO2022/185077
PCT Pub. Date: Sep. 9, 2022

(65) Prior Publication Data
US 2024/0168229 A1    May 23, 2024

(30) Foreign Application Priority Data
Mar. 5, 2021   (GB) .................................. 2103138

(51) Int. Cl.
G02B 6/136   (2006.01)
G02B 6/12    (2006.01)
G02B 6/42    (2006.01)

(52) U.S. Cl.
CPC ......... *G02B 6/136* (2013.01); *G02B 6/12002* (2013.01); *G02B 6/12004* (2013.01);
(Continued)

(58) Field of Classification Search
CPC .................. G02B 6/12002; G02B 6/12004; G02B 6/136; G02B 6/4224; G02B 2006/12061; G02B 2006/12176
See application file for complete search history.

(56) References Cited

U.S. PATENT DOCUMENTS 5,042,709 A    8/1991  Cina et al.
7,881,580 B2 *  2/2011  Watanabe ............ G02B 6/4227
                                              385/91
(Continued)

FOREIGN PATENT DOCUMENTS

EP    0977061    2/2000
EP    1972975    9/2008
(Continued)

OTHER PUBLICATIONS

International Search Report and Written Opinion issued in corresponding PCT Patent Application No. PCT/GB2022/050583, dated Aug. 15, 2022.
(Continued)

*Primary Examiner* — Daniel Petkovsek
(74) *Attorney, Agent, or Firm* — Pillsbury Winthrop Shaw Pittman, LLP (57) ABSTRACT

A photonic device has a waveguide, such as a ridge waveguide, defined by a waveguide etch, an etched facet defined by a facet etch and having an optical coupling region optically coupled to the waveguide, and a fiducial mark configured for alignment of an optical component, such as a photonic integrated circuit, to the optical coupling region. The fiducial mark has a first portion defined by at least a part of the waveguide etch and a second portion defined by at least a part of the facet etch. The first portion has an elongate broken bar shape that extends lengthwise along a direction parallel to the waveguide's propagation direction at the optical coupling region. The second portion includes an
(Continued)

elongate shape that extends lengthwise orthogonally with respect to its etch depth and with respect to the waveguide's propagation direction at the optical coupling region.

20 Claims, 7 Drawing Sheets

(52) U.S. Cl.
CPC .. *G02B 6/4224* (2013.01); *G02B 2006/12061* (2013.01); *G02B 2006/12176* (2013.01)

(56) References Cited

U.S. PATENT DOCUMENTS

| | | | |
|---|---|---|---|
| 10,107,975 | B1 | 10/2018 | Lam et al. |
| 10,466,433 | B2 * | 11/2019 | Epitaux ................ G02B 6/4214 |
| 11,686,906 | B1 * | 6/2023 | Venkatesan .......... G02B 6/4238 385/93 |
| 11,953,728 | B2 * | 4/2024 | Yu ..................... H01L 21/67751 |
| 2002/0151181 | A1 | 10/2002 | Boudreau et al. |
| 2003/0044120 | A1 | 3/2003 | Mignosi et al. |
| 2005/0032264 | A1 | 2/2005 | O'Gorman |
| 2015/0093069 | A1 | 4/2015 | Nakamura |
| 2016/0116688 | A1 | 4/2016 | Hochberg et al. |
| 2017/0343747 | A1 | 11/2017 | Giziewicz et al. |

FOREIGN PATENT DOCUMENTS

| | | |
|---|---|---|
| WO | 2018036161 | 3/2018 |
| WO | 2019177908 | 9/2019 |

OTHER PUBLICATIONS

Search Report issued in corresponding Great Britain Patent Application No. 2103138.0, dated Dec. 14, 2021.

Examination Report issued in corresponding Great Britain Patent Application No. 2203072.0, dated Aug. 17, 2022.

AARSearch Report issued in corresponding Great Britain Patent Application No. 2203072.0, dated Aug. 16, 2022.

* cited by examiner

PHOTONIC DEVICE WITH FIDUCIAL MARKS FOR ALIGNMENT OF AN OPTICAL COMPONENT

This application is the U.S. national phase entry of PCT Patent Application No. PCT/GB2022/050583, which was filed on Mar. 4, 2022, which claims priority to United Kingdom Patent Application No. 2103138.0, filed Mar. 5, 2021.

The present invention relates to photonic devices, their method of fabrication, a method of assembly of photonic devices, and flip-chip package. These are suitable for passive alignment of compound semiconductor lasers with silicon photonic integrated circuits (PICs) in a flip-chip assembly, for example.

BACKGROUND ART

In the field of photonic devices, an etched-facet waveguide can be processed more easily than a cleaved-facet waveguide made by cleaving the substrate.

Etched-facet compound semiconductor photonic devices (for example InP lasers) can be flip-chip assembled to silicon photonic integrated circuits (PICs) using a process of passive alignment and die attach.

The conventional alignment mark for this purpose is a plus-shaped fiducial mark defined at the same time as the compound semiconductor waveguide. The lithographic pattern defining the facet is then aligned to the waveguide using the plus-shaped mark.

Subsequently, during flip-chip assembly, the silicon photonic circuit is aligned to the waveguide using the plus-shaped fiducial mark.

This may be done using a retractable beam-splitter inserted between the two components, the compound semiconductor photonic device and the photonic integrated circuit, as they are assembled. The beam-splitter captures images of complementary alignment marks above and below it on the respective components. Alignment is performed by moving one or both of the compound semiconductor photonic device and the photonic integrated circuits, before the beam splitter is retracted and the two components are brought into contact for die attach using solder.

Although aligning by beam-splitter is often the case for semi-automatic assembly, the fiducial marks may instead be captured by different cameras on the two parts separately. This involves for example taking separate images of the laser chip on a pickup tool and silicon photonic circuit on a bonding stage and working out the necessary movements to make them aligned during assembly.

A problem with conventional alignment marks is that although the silicon photonic integrated circuit is aligned directly to the waveguide, it is not directly aligned to the facet etch, where light couples between the waveguide and the silicon photonic circuit. Alignment errors introduce variation into the optical coupling between the assembled components. Alignment errors can adversely affect the performance and yield of the assembly.

Aligning to the etched facet itself would be difficult because it is coated, for example with an anti-reflective coating, and it is a single edge.

SUMMARY OF INVENTION

It is desirable to provide a photonic device and method of assembly, that overcomes at least some of the above-identified problems.

According to a first aspect of the present invention, there is provided a photonic device comprising:
a waveguide defined by a waveguide etch;
an etched facet defined by a facet etch and having an optical coupling region optically coupled to the waveguide; and
a fiducial mark configured for alignment of an optical component to the optical coupling region,
wherein the fiducial mark has
a first portion defined by at least a part of the waveguide etch; and
a second portion defined by at least a part of the facet etch.

Preferably, the optical component comprises a photonic integrated circuit.

Preferably, the waveguide and the first portion of the fiducial mark are formed with a first etch depth, and the second portion of the fiducial mark and a structure comprising the optical coupling region are formed with a second etch depth.

Preferably, the waveguide is a ridge waveguide.

Alternatively, the waveguide is a buried heterostructure waveguide.

Preferably, the first portion comprises an elongate shape that extends along a direction parallel to the waveguide's propagation direction at the optical coupling region.

Preferably, the elongate shape of the first portion extends lengthwise along the direction parallel to the waveguide's propagation direction at the optical coupling region.

Preferably, the second portion comprises an elongate shape that extends orthogonally with respect to its etch depth and with respect to the waveguide's propagation direction at the optical coupling region.

Preferably, the elongate shape of the second portion extends lengthwise orthogonally with respect to its etch depth and with respect to the waveguide's propagation direction at the optical coupling region.

Preferably, the first and second portions of the fiducial mark are arranged together into a plus-shaped pattern.

Alternatively, the first and second portions of the fiducial mark are arranged together into an L-shaped pattern.

According to a second aspect of the present invention, there is provided a flip-chip package comprising a first photonic device having a fiducial mark in accordance with the first aspect and a second photonic device attached to the first photonic device.

According to a third aspect of the present invention, there is provided a method of assembly of a first photonic device with a second photonic device, the method comprising the steps:
obtaining a first photonic device having a fiducial mark, in accordance with the first aspect;
aligning the first photonic device to the second photonic device using the first and second portions of the fiducial mark; and
attaching the aligned photonic devices together.

Preferably, the second photonic device comprises a photonic integrated circuit.

According to a fourth aspect of the present invention, there is provided a method of fabrication of a photonic device, the method comprising the steps:
defining by at least a part of a waveguide etch a first portion of fiducial mark and a waveguide; and
defining by at least a part of a facet etch a second portion of the fiducial mark and an etched facet having an optical coupling region optically coupled to the waveguide, wherein the fiducial mark is configured for alignment of an optical component to the optical coupling region.

Preferably, the method further comprises applying a first fiducial protect mask between first and second parts of the waveguide etch to cover and protect the first portion from the second part of the waveguide etch.

Preferably, the method further comprises applying a second fiducial protect mask between first and second parts of the facet etch to cover and protect the second portion from the second part of the facet etch.

According to a fifth aspect of the present invention, there is provided a photonic device comprising:
a waveguide defined by a waveguide etch;
an optical coupling region optically coupled to the waveguide and defined by a coupler etch; and
a fiducial mark configured for alignment of an optical component to the optical coupling region,
wherein the fiducial mark has
a first portion defined by at least a part of the waveguide etch; and
a second portion defined by at least a part of the coupler etch.

Preferably, the coupler etch is a facet etch and the optical coupling region is a region of a waveguide etched facet defined by the facet etch.

Alternatively, the coupler etch is a grating coupler etch and the optical coupling region is a region of an etched grating coupler defined by the grating coupler etch.

The photonic device of the fifth aspect may be combined with the features listed above following the first aspect.

According to a sixth aspect of the present invention, there is provided a method of fabrication of a photonic device, the method comprising the steps:
defining by at least a part of a waveguide etch a first portion of fiducial mark and a waveguide; and
defining by at least a part of a coupler etch a second portion of the fiducial mark and an optical coupling region optically coupled to the waveguide,
wherein the fiducial mark is configured for alignment of an optical component to the optical coupling region.

Preferably, the coupler etch is a facet etch and the optical coupling region is a region of a waveguide etched facet defined by the facet etch.

Alternatively, the coupler etch is a grating coupler etch and the optical coupling region is a region of an etched grating coupler defined by the grating coupler etch.

The photonic device of the sixth aspect may be combined with the features listed above following the fourth aspect.

BRIEF DESCRIPTION OF DRAWINGS

Embodiments of the present invention will now be described, by way of example only, with reference to the drawings, in which.

DETAILED DESCRIPTION

In this description and claims, optical and optical radiation relate to electromagnetic radiation over a range of wavelengths not limited to visible radiation, such as wavelengths spanning ultraviolet, visible and infrared radiation. An InP laser is described as an example of a photonic device. Other compound semiconductor based devices may be used with embodiments. For example photonic devices based on GaAs, GaSb, or GaN, or photonic devices based on other material systems, may be used. Rather than the laser chip example described herein, other photonic devices may be used, such as semiconductor optical amplifiers (SOAs), reflective semiconductor optical amplifiers (RSOAs) used stand-alone or in external cavity lasers, or electro-absorption modulators (EAMs), or waveguide detectors.

Embodiments provide alignment error reduction during passive alignment and flip-chip die attach of photonic devices.

In embodiments, the optical output position of a compound semiconductor laser chip is defined by two independent lithography stages. The fiducial mark is defined by a combination of both of the lithography stages, which eliminates registration error between the fiducial mark and the compound semiconductor laser chip output.

In an example, X-alignment and Y-alignment components of the passive-alignment fiducial mark are defined in separate lithographic layers. X and Y might not be orthogonal, for example for curved waveguides. The X and Y components may be overlaid into standard plus or L-shaped fiducial marks, compatible with standard alignment systems.

An advantage of embodiments is that the silicon photonic circuit can be accurately aligned directly to the compound semiconductor laser chip optical output region (for example facet) and simultaneously directly aligned to the waveguide.

Figure 1A:
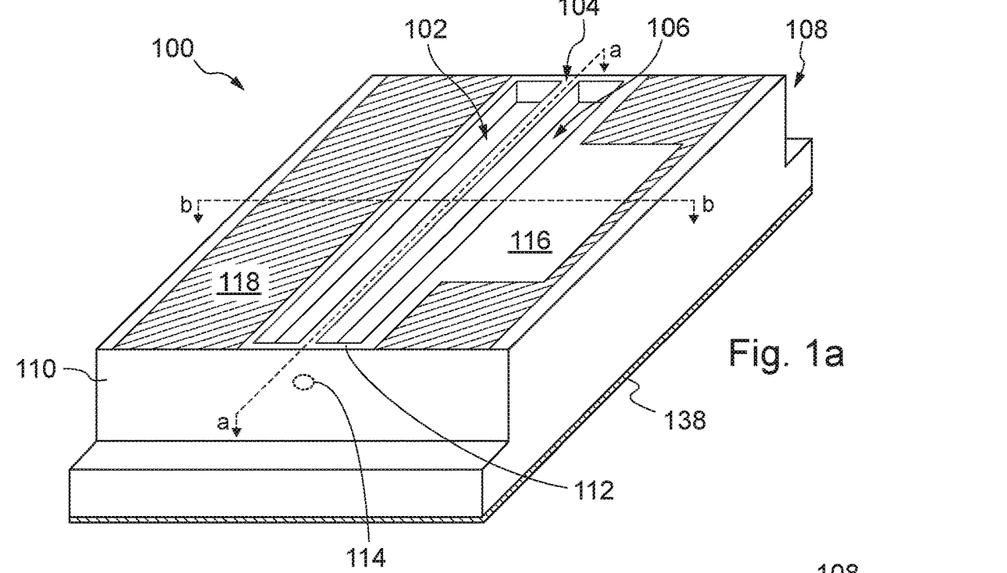
FIG. 1 illustrates, in schematic form, a known etched-facet laser chip in orthographic and cross-section views.
Figure 1B:
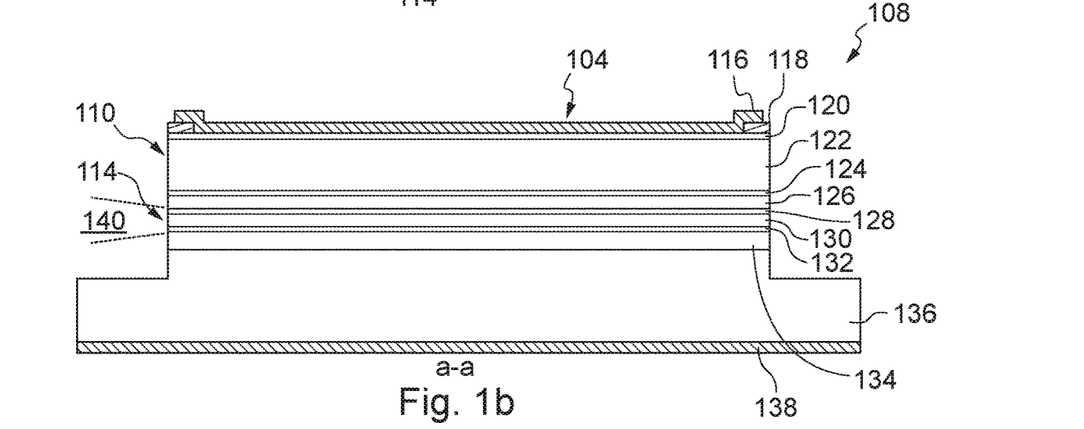
Figure 1C:
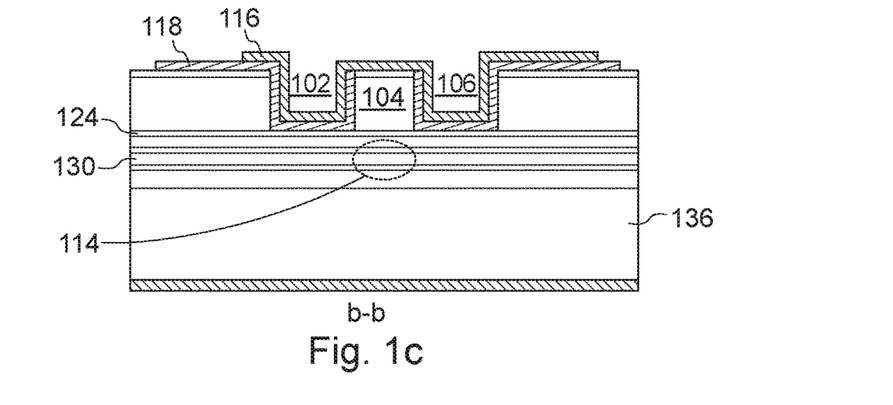

FIG. 1 illustrates a known photonic device, in this example an etched-facet laser chip 100, with a compound semiconductor laser on an InP (indium phosphide) substrate. FIG. 1a is an orthographic view of the laser chip 100. FIG. 1b is a cross-section (not to scale) along a-a shown in FIG. 1a. FIG. 1b is thus a cross-section through the waveguide 104 along its propagation direction (length). FIG. 1c is a cross-section (not to scale) along b-b shown in FIG. 1a. FIG. 1c is thus a cross-section across the waveguide 104 perpendicular to its propagation direction.

The structure of the laser chip 100 is now described in the context of its wafer-scale fabrication.

A ridge waveguide 104 is defined by a waveguide etch. A pattern of openings in a hard mask (202, 206 in FIG. 2) in a lithographic step defines trenches 102, 106 that are etched to define the ridge waveguide 104 in between them. An insulating dielectric material 118 covers most of the top surface, and a contact window is opened up in the dielectric along the top of the ridge 104. Subsequently, metal 116 is deposited covering the ridge waveguide and making contact through the contact window to the top of the ridge waveguide 104.

A pad of the metal 116 at one side of the ridge waveguide is used as an area for soldering or bonding to the metal. In subsequent fabrication steps, a patterned hard mask and facet etch defines etched facets 110, 108 at either end of the ridge waveguide 104. The facet etch is deeper than the ridge etch.

A small horizontal spacing is provided between the ridge trenches 102, 106 and the facet etch features, so that the etched facets 108, 110 are etched as flat planes rather than having corners with the ridge waveguide, which would etch unevenly and would be detrimental to the smoothness of the facet at the end of the waveguide. This results in a structure shaped like a T, with the waveguide being the trunk of the T, and walls 112 being the crossbar of the T. The effect of the spacing and resulting T-shaped structure is to ensure that the facet is smooth to provide efficient and reproducible transmission through optical coupling regions, or internal reflection at, the facets.

After the facet etch, an antireflective coating is applied to one etched facet 110 and a high-reflectance coating is applied to the other etched facet 108 at the other end of the waveguide 104. Such coatings are used for a laser chip, however antireflective coatings may be applied to both facets for Semiconductor Optical Amplifiers (SOAs) or Electro-Absorption Modulators (EAMs). For ultra-short cavity lasers, highly-reflective coatings may be applied to both facets.

Finally, a metallisation step coats the underside of the wafer with metal 138.

With reference to FIGS. 1a and 1b, in operation the laser cavity, comprising the waveguide 104 bounded by facets 108 and 110 at either end, outputs optical radiation 140 through an optical coupling region 114.

With reference to FIGS. 1b and 1c, the layer structure will now be described in detail. From the top in FIG. 1b, a p-metal layer 116 extends down through a window in the dielectric layer 118. The p-metal layer 116 makes contact to a p-type InGaAs contact layer 120, which is the top epitaxially-grown layer. Below that, a p-type InP cladding layer 122 is followed by a p-type etch stop layer 124. The etch that stops on that layer 124 is the waveguide ridge etch, as illustrated in FIG. 1c. Next, a p-type InP spacer layer 126 is followed by a p-type separate confinement heterostructure (SCH) layer 128, an undoped multi-quantum well (MQW) layer 130, and an n-type SCH layer 132. The SCH and MQW layers are the optically active layers in the laser.

The n-type InP buffer layer 134 is the first of the epitaxial layers that is grown on the n-type InP substrate 136. Finally, the n-metal layer 138 is shown.

In operation, as shown at the left of FIG. 1b, a beam of optical radiation 140, illustrated bounded with dotted lines, is output from the etched facet 110 at the optical coupling region 114. In this example, the optical radiation is output from the optically active layers of the ridge waveguide 128, 130, 132 into the air to the left of the etched facet 110.

With reference to FIG. 1c, the p-metal layer 116 can be seen on top of the dielectric layer 118 as it covers trenches 102, 106 either side of the ridge waveguide 104. The p-metal layer 116 contacts the top of the ridge 104 through a window in the dielectric 118. The trenches 102, 106 are etched by the waveguide etch, which selectively stops on the p-type etch stop layer 124.

The location of the optical coupling region 114 is shown projected along the waveguide from the etched facet 110 onto this cross-section plane b-b. It is centred horizontally with respect to the ridge waveguide 104 and centred vertically with respect to the undoped MQW layer 130.

In the drawings of FIG. 1 and in subsequent drawings, features labelled with the same numerals correspond to the same features in subsequent drawings. Therefore a description of a feature in any drawing should also apply to a feature labelled with the same numeral elsewhere in this description.

Figure 2:
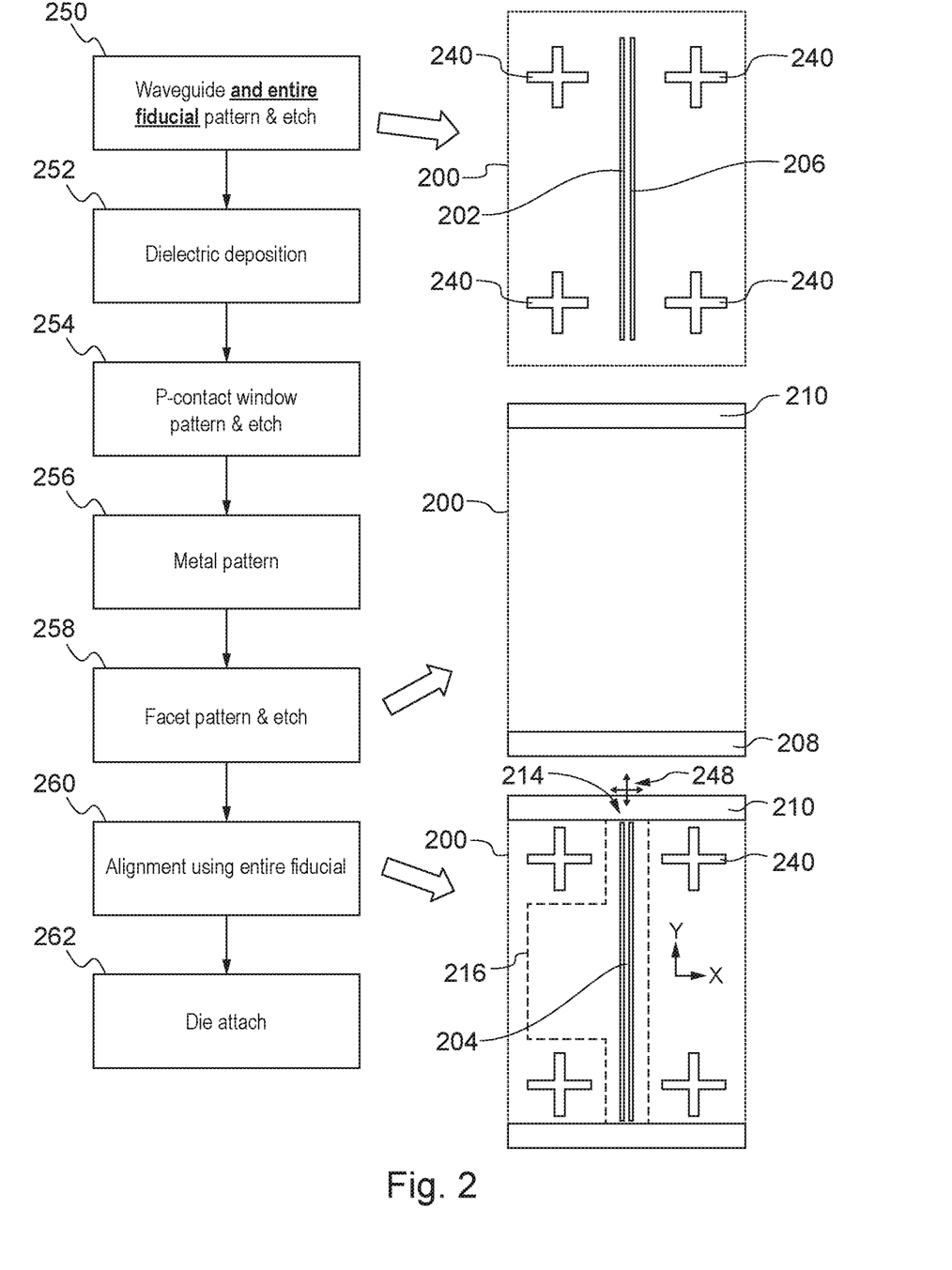
FIG. 2 is a flowchart of a method of fabrication of a laser chip and its assembly with a silicon photonic integrated circuit using a known process, with selected patterns schematically illustrated alongside.

FIG. 2 shows some (but not all) of the steps in the fabrication of a laser chip and its assembly with a silicon photonic integrated circuit using a known process. Alongside the flowchart, plan views of various patterns of the laser chip are shown. The steps are:

250: The waveguide and each entire fiducial mark are patterned and etched. Thus, the entire fiducial mark is defined by the waveguide etch. The pattern comprises two trenches 202, 206 that correspond to the trenches 102, 106 illustrated in FIG. 1 and other drawings. Plus-shaped fiducial marks 240 are provided in each quadrant of the laser chip. An outline of the laser chip is shown as a dotted line 200 to guide the eye, although the patterning steps are performed at a wafer level, before singulation into laser chips.

252: A dielectric deposition step coats the top of the wafer with dielectric 118 illustrated in FIG. 1 and other drawings.

254: A contact windows pattern is applied and an etch opens the windows through the dielectric 118 to the top of the ridge 104 to allow contact to the p-type layers in the ridge waveguide.

256: The p-metal pattern 216 is applied to define the extent of the p-metal layer 116 illustrated in FIG. 1 and other drawings.

258: A facet pattern 208, 210 is defined in a hard mask and a facet etch is used to etch deep through the laser active layers, to form the etched facets.

260: After some more processing, including deposition of antireflective and high-reflectivity coating of the respective facets, when the laser chip is ready for assembly it is positioned upside-down above the silicon photonic integrated circuit and alignment is performed using the fiducial marks.

With reference to the pattern schematic at the lower right of FIG. 2, the p-metal pattern is shown with a dashed line 216. During assembly, the optical coupling region 214 at the end of the ridge 204 is aligned to an optical coupling component of the silicon photonic integrated circuit (PIC). A problem with this alignment is illustrated by the relative X and Y size of the crossed arrows 248.

The variation in alignment of the optical coupling region 214 to the PIC is relatively small in the X direction. This is illustrated by the X component of the crossed arrows 248 being relatively small. This because the PIC is aligned directly to the waveguide ridge 204 as the fiducial 240 is defined by the same etch that defines the waveguide ridge 204. Features defined by the same etch tend to have the same systematic linewidth variation, known as process bias.

However, because the PIC is not aligned directly to the etched-facet feature 210, there is more Y variation than there is X variation. This is illustrated by relatively longer Y component of the crossed arrows 248. In other words, this known arrangement provides relatively good alignment of the PIC to the lateral position of the waveguide and relatively poor longitudinal alignment of the PIC to the optical coupling region 214 on the etched facet. Therefore, the optical component in the PIC which needs to couple to the waveguide 204 via the optical coupling region 214 may be either too close or too far away from it. Therefore a reduction in efficiency of the coupling results. As mentioned above, such alignment errors can adversely affect the performance and yield of the assembly.

262: Finally, the aligned photonic devices are attached together.

FIG. 3 illustrates a laser chip with known fiducial marks in an orthographic view, with cross sections through a known fiducial mark. The laser chip is fabricated using the process described with reference to FIG. 2.

Figure 3A:
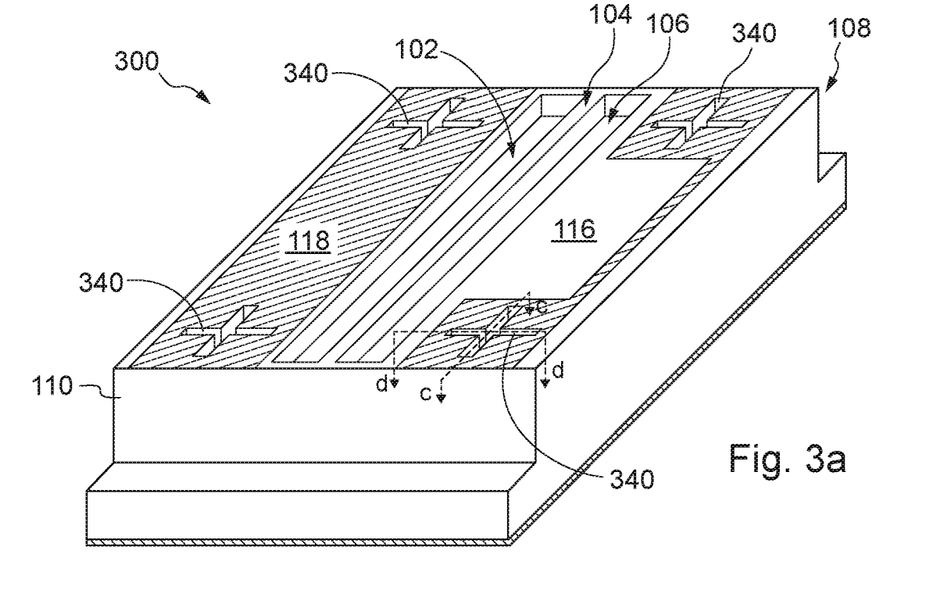
FIG. 3 illustrates, in schematic form, a laser chip with known fiducial marks in an orthographic view, with cross sections through the known fiducial mark.
Figure 3B:
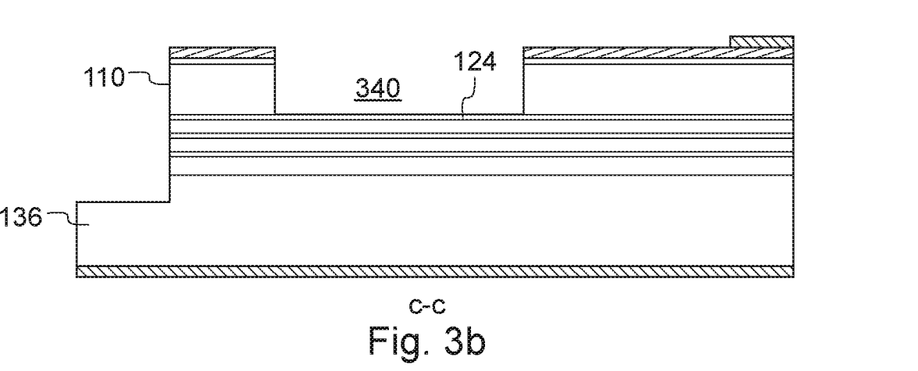
Figure 3C:
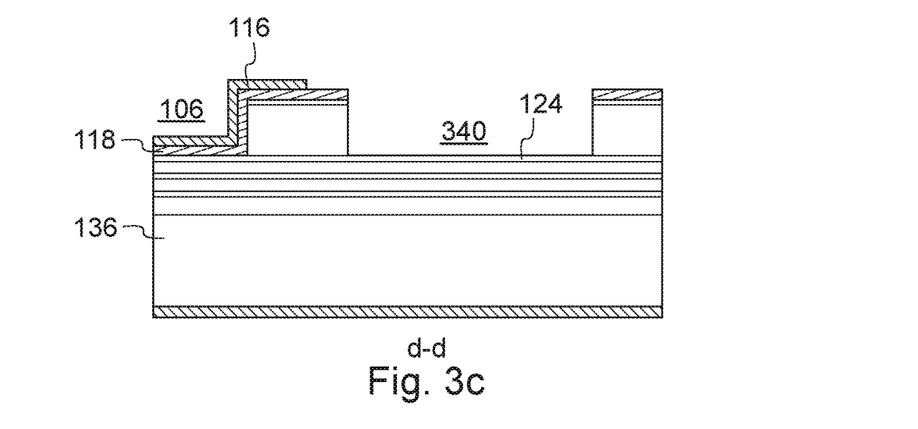

FIG. 3a illustrates a known photonic device, in this example an etched-facet laser chip 300, similar to that illustrated in FIG. 1a and sharing its features. Compared to FIG. 1, known fiducial marks have been added. FIG. 3a is an orthographic view of the laser chip 300. FIG. 3b is a cross-section (not to scale) along c-c shown in FIG. 3a. FIG. 3b is thus a cross-section through the known fiducial mark 340. FIG. 3c is a cross-section (not to scale) along d-d shown in FIG. 3a. FIG. 3c is thus a cross-section through the known fiducial mark 340 in a direction perpendicular to that shown in FIG. 3a.

The structure of the fiducial mark 340 is now described in the context of its associated laser chip.

As mentioned above, the entire fiducial mark 340 is defined by the waveguide etch that also defines the waveguide 104. A hard mask plus-shaped pattern (240 in FIG. 2) in a lithographic step defines the entire fiducial mark 340 at the same time as trenches 102, 106 that are etched to define the ridge waveguide 104 in between them.

In subsequent fabrication steps, a patterned hard mask and facet etch defines etched facets 110, 108 at either end of the ridge waveguide 104.

With reference to FIGS. 3b and 3c, the structure of the fiducial mark 340 will now be described in detail in the context of its wafer-scale fabrication.

The fiducial mark 340 is etched by the waveguide etch, along with the trenches 102, 106. The waveguide etch selectively stops on the p-type etch stop layer 124. All portions of the fiducial mark 340 therefore have the same etch depth (for example 1.6 μm), which is the same depth as the trenches 102, 106 that define the ridge waveguide 104. The facet etch extends down into the substrate 136 (for example to a depth of 8 μm), as is shown at the left-hand side of FIG. 3b.

Figure 4:
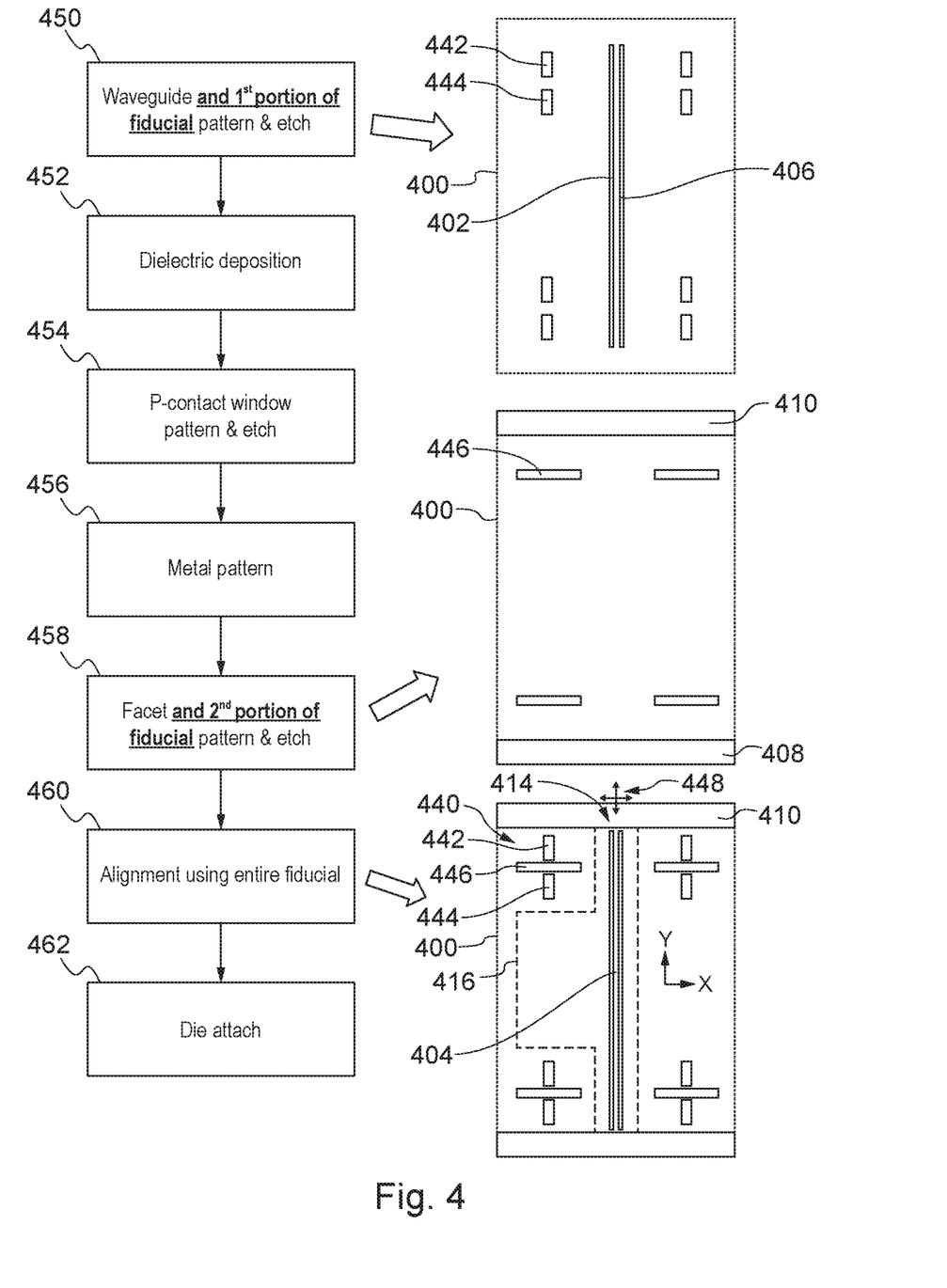
FIG. 4 is a flowchart of a method of fabrication of a laser chip and its assembly with a silicon photonic integrated circuit in accordance with an embodiment of the present invention, with selected patterns schematically illustrated alongside.

FIG. 4 shows some (but not all) of the steps in the fabrication of a laser chip and its assembly with a silicon photonic integrated circuit in accordance with an embodiment of the present invention. Alongside the flowchart, plan views of various patterns of the laser chip are shown. The steps are:

450: The waveguide and a first portion of the fiducial mark are patterned and etched. Thus, the first portion of the fiducial mark is defined by the waveguide etch. The pattern comprises two trenches 402, 406 that correspond to the trenches 102, 106 illustrated in FIG. 1 and other drawings. A first portion 442, 444 of what will ultimately be plus-shaped fiducial marks are provided in each quadrant of the laser chip. An outline of the laser chip 400 is shown as a dotted line to guide the eye, although the patterning steps are performed at a wafer level, before singulation into laser chips.

452: A dielectric deposition step coats the top of the wafer with dielectric 118 illustrated in FIG. 1 and other drawings.

454: A contact windows pattern is applied and an etch opens the windows through the dielectric 118 to the top of the ridge 104 to allow contact to the p-type layers in the ridge waveguide.

456: The p-metal pattern 416 is applied to define the extent of the p-metal layer 116 illustrated in FIG. 1 and other drawings.

458: A facet pattern 408, 410 and a second portion 446 of the fiducial mark are defined in a hard mask and a facet etch is used to etch deep through the laser active layers, to form the second portion of the fiducial mark and the etched facets. The first portion 442, 444 and second portion 446 of the fiducial mark together make a plus-shaped fiducial mark in this example. The facet pattern 498, 410 is truncated by the chip boundary 400 in this illustration, but actually extends further on the wafer.

Thus, the method of fabrication of a photonic device (in this example a laser chip) has several steps. A waveguide etch 450 defines a first portion 442, 444 of fiducial mark and a waveguide 404. A coupler etch (in this example a facet etch) 458 defines a second portion 546 of the fiducial mark and an optical coupling region 114 optically coupled to the waveguide. The fiducial mark 442, 446, 444 is configured for alignment of an optical component to the optical coupling region 414.

460: After some more processing, including deposition of antireflective and high reflectivity coating of the respective facets, when the laser chip is ready for assembly it is positioned upside-down above the silicon photonic integrated circuit (PIC) and alignment is performed using the first and second portions of the fiducial marks.

With reference to the pattern schematic at the lower right of FIG. 4, the p-metal pattern is shown with a dashed line 416. During assembly, the optical coupling region 414 at the end of the ridge 404 is aligned to an optical coupling component of the silicon photonic integrated circuit (PIC). The improved alignment provided by embodiments of the present invention is illustrated by the equal X and Y sizes of the crossed arrows 448, compared to the unequal crossed arrows 248 described with reference to FIG. 2.

The variation in alignment of the optical coupling region 414 to the PIC is small in the X direction. This is illustrated by the X component of the crossed arrows 448 being small. This because the PIC is aligned directly to the waveguide ridge 404 as the first portion 442, 444 of the fiducial is defined by the same etch that defines the waveguide ridge 404.

According to embodiments of the present invention, because the second portion 446 of the fiducial mark is defined by the same etch as the etched facet feature 410, the PIC is effectively aligned directly to the etched-facet feature 210. Therefore, there is the same or similar Y variation compared to X variation. This is illustrated by the same lengths of X and Y component of the crossed arrows 448. In other words, this arrangement provides not only good alignment of the PIC to the lateral position of the waveguide, but also good longitudinal alignment of the PIC to the optical coupling region 414 on the etched facet. Therefore, the optical component in the PIC which needs to couple to the waveguide 204 via the optical coupling region 214 is better aligned to it, compared to the known example described with reference to FIGS. 2 and 3.

The laser chip may have an array of waveguides sharing the same etched facet, or with multiple respective facets being etched by the same facet etch step. The array of waveguides are subsequently aligned to an array of optical components on the PIC. Rotational misalignment of the waveguide array to the PIC can cause a range of longitudinal misalignments of individual waveguides of the array to the respective optical components on the PIC. Having more than one fiducial mark in accordance with the present invention on the array chip allows accurate rotational alignment. For example, if an etched facet extending across an array of waveguides is rotationally aligned parallel to a silicon sidewall on the PIC, using fiducial marks according to an embodiment of the present invention, then the gap between each waveguide facet and corresponding optical component on the PIC is consistent across the array and can be minimised to reduce insertion loss, which cannot be done with conventional fiducial marks alone. There may be applications which require very wide arrays where this would be critical.

Embodiments result in an improvement in efficiency of optical coupling. Reducing such longitudinal and rotational alignment errors benefits the performance and yield of the assembly.

Thus, the method of assembly has several steps. First, a first photonic device (in this example a laser chip) is obtained having a fiducial mark(s) with first and second portions, described with reference to FIGS. 4, 5 and 6. Next, the laser chip is aligned 460 to a second photonic device (in this example a PIC) using the first and second portions of the fiducial mark(s). Finally, the aligned photonic devices are attached 462 together.

FIG. 5 illustrates a laser chip with deep fiducial marks corresponding to those described with reference to FIG. 4.

Figure 5A:
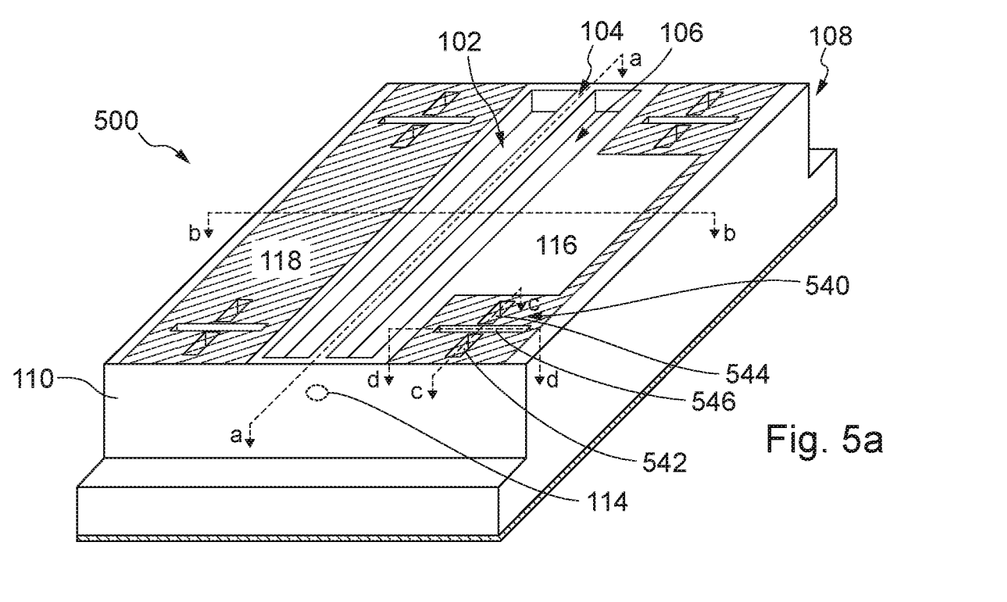
FIG. 5 illustrates, in schematic form, a laser chip with deep fiducial marks in an orthographic view, with cross sections through a fiducial mark in accordance with an embodiment of the present invention.
Figure 5B:
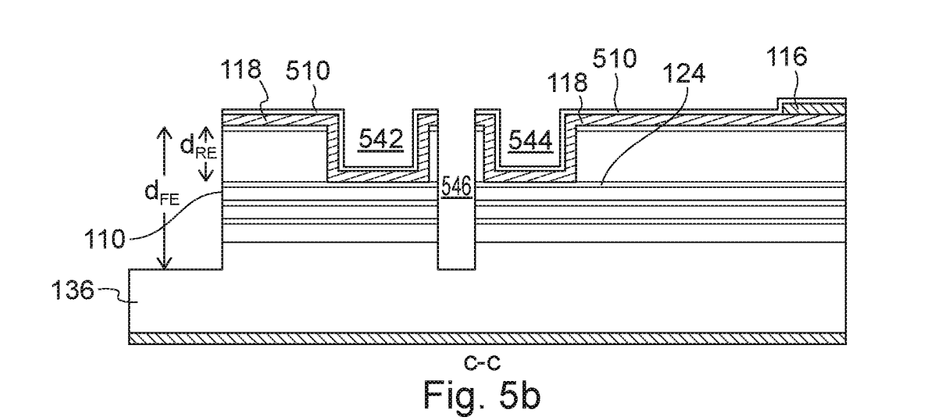
Figure 5C:
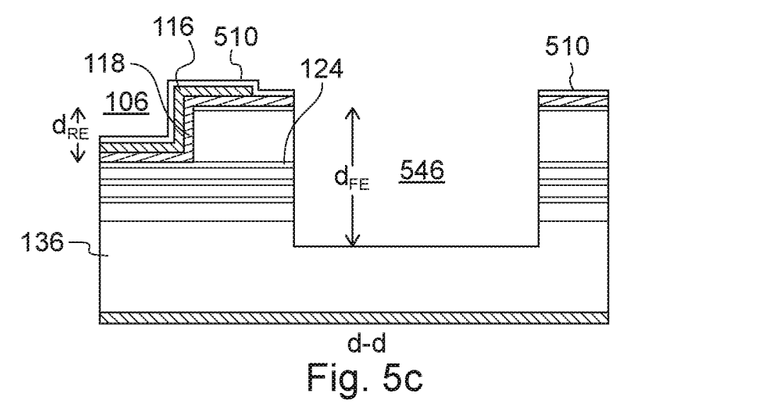

FIG. 5a illustrates a photonic device, in this example an etched-facet laser chip 500, similar to that illustrated in FIG. 1a and sharing most of its features. Compared to FIG. 1, fiducial marks have been added in accordance with an embodiment of the present invention. FIG. 5a is an orthographic view of the laser chip 500. FIG. 5b is a cross-section (not to scale) along c-c shown in FIG. 5a. FIG. 5b is thus a cross-section through both portions 542, 544 and 546 of the fiducial mark 540. FIG. 5c is a cross-section (not to scale) along d-d shown in FIG. 5a. FIG. 5c is thus a cross-section through one portion 546 of the fiducial mark in a direction perpendicular to that shown in FIG. 5a.

The laser chip is a photonic device. It has a waveguide 104 defined by a waveguide etch. In this example, the waveguide is a ridge waveguide. Another example of a suitable waveguide for use in embodiments is a buried heterostructure waveguide (not shown).

An optical coupling region 114 is optically coupled to the waveguide and defined by a coupler etch. In this example the coupler etch is a facet etch and the optical coupling region is a region of a waveguide etched facet defined by the facet etch. In another example, further described with reference to FIG. 8, the coupler etch is a grating coupler etch and the optical coupling region is a region of an etched grating coupler defined by the grating coupler etch.

Fiducial mark 540 is configured for alignment of an optical component to the optical coupling region 114. The optical component in this example comprises a photonic integrated circuit. The fiducial mark 540 has a first portion 542, 544 defined by the waveguide etch and a second portion 546 defined by the facet etch. The first portion 542, 544 comprises a pair of elongate shapes, in this example in a broken bar shape, that extend lengthwise along a direction parallel to the waveguide's propagation direction at the optical coupling region. The second portion 546 comprises an elongate shape that extends lengthwise orthogonally with respect to its etch depth and with respect to the waveguide's propagation direction at the optical coupling region. These directions of elongation mean that the fiducial marks have long edges parallel to the waveguide and the etched facet respectively. The long edges can be aligned to accurately by conventional mark-detection systems. Thus the fiducial mark 540 is configured with long edges for alignment of an optical component to the optical coupling region 114 of the etched facet. The waveguide's propagation direction at the optical coupling region is relevant, rather than the waveguide's propagation direction elsewhere, or the direction of the facet. This is because the long edges should be optimally oriented to align to the optical coupling region, even if the waveguide is bent at a point further away from the region, or if the facet is not perpendicular to the waveguide at the region, as may be found in known photonic devices.

In this example the first 542, 544 and second 546 portions of the fiducial mark are arranged together into a plus pattern, with the second portion bisecting the first portion. In another example (not shown), the first and second portions of the fiducial mark are arranged together into an L-shaped pattern. Other patterns may be used that are suitable for mark detection for alignment during component assembly.

Furthermore, although the first and second portions are elongate rectangles with reference to FIG. 5 (and FIG. 6 below), they may be other shapes suitable for recognition by a vision system for alignment, such as squares, ovals or circles.

The structure of the fiducial mark 540 is now described in the context of its associated laser chip.

As mentioned above, a first portion 542, 544 of the fiducial mark is defined by the waveguide etch that also defines the waveguide 104. A hard mask broken-bar-shaped pattern (442, 444 in FIG. 4) in a lithographic step defines the first portion of the fiducial mark 540 at the same time as trenches 102, 106 that are etched to define the ridge waveguide 104 in between them.

In subsequent fabrication steps, a patterned hard mask 510 and facet etch defines etched facets 110, 108 at either end of the ridge waveguide 104.

With reference to FIG. 5a, in operation, the laser cavity, comprising the waveguide 104 bounded by facets 108 and 110 at either end, outputs optical radiation through an optical coupling region 114. In this example, the optical radiation is output from the optically active layers of the ridge waveguide into the air beyond the etched facet 110.

With reference to FIGS. 5b and 5c, the structure of the fiducial mark 540 will now be described in detail in the context of its wafer-scale fabrication.

The first portion 542, 544 of the fiducial mark 540 is etched by the waveguide etch, along with the trenches 102, 106. The waveguide etch selectively stops on the p-type etch stop layer 124. The first portion 542, 544 of the fiducial mark 540 is formed with a first etch depth $d_{RE}$, which is the same depth as the trenches 102, 106 that form the ridge waveguide 104.

The second portion 546 of the fiducial mark 540 is formed with a second etch depth $d_{FE}$, which is the same etch depth of the features (408, 410 in FIG. 4) that define the etched facets 108, 110. Thus, both the second portion of the fiducial mark and the structure comprising the optical coupling region (i.e. the etched facet in this example) are formed with a second etch depth $d_{FE}$.

The process described with reference to FIG. 5 creates very deeply etched alignment marks, particularly for the second portion, which is etched through the active layers. It can be difficult to align to such deep marks.

It is possible to obtain shallow and thus sharper defined alignment marks, by splitting each of the ridge and facet etches into two stages and inserting masking steps to protect the respective portions of the marks in between the split stages.

FIG. 6 illustrates a laser chip with shallow fiducial marks corresponding to those described with reference to FIG. 4.

Figure 6A:
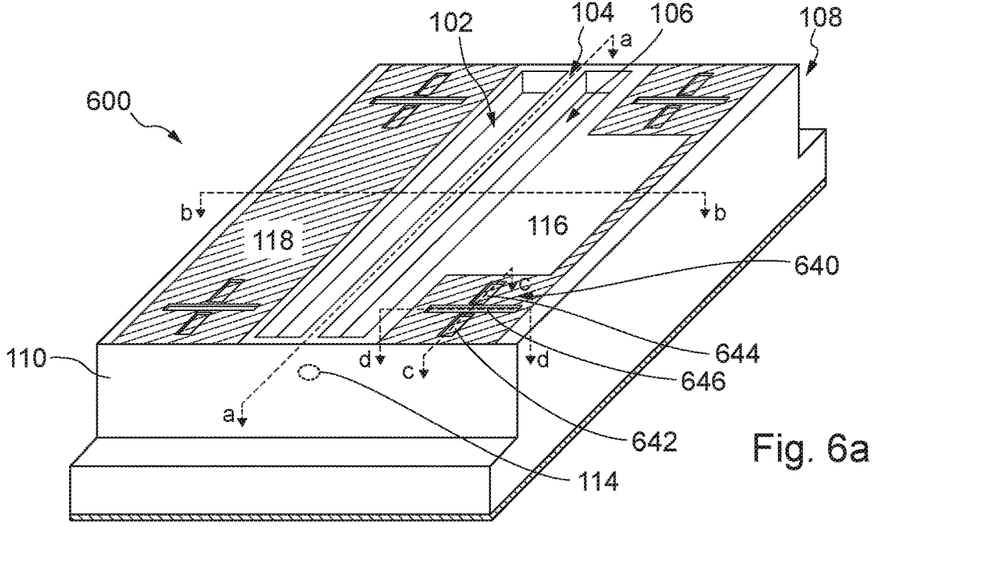
FIG. 6 illustrates, in schematic form, a laser chip with shallow fiducial marks in an orthographic view, with cross sections through a fiducial mark in accordance with an embodiment of the present invention.

FIG. 6a illustrates a photonic device, in this example an etched-facet laser chip 600, similar to that illustrated in FIG. 1a and sharing most of its features.

Figure 6B:
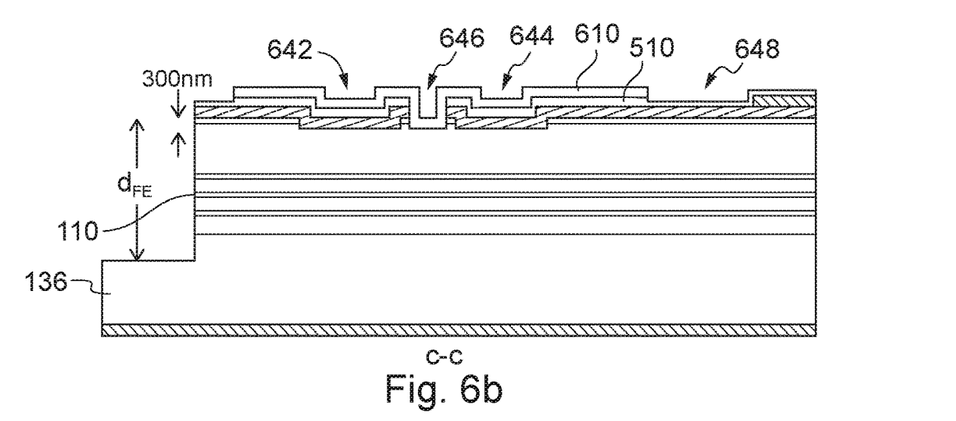
Figure 6C:
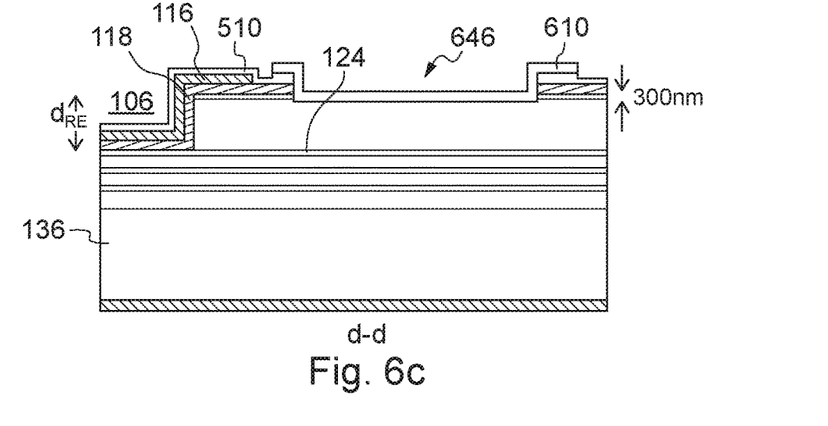

Compared to FIG. 1, fiducial marks have been added in accordance with an embodiment of the present invention. FIG. 6a is an orthographic view of the laser chip 600. FIG. 6b is a cross-section (not to scale) along c-c shown in FIG. 6a. FIG. 6b is thus a cross-section through both portions 642, 644 and 646 of the fiducial mark 640. FIG. 6c is a cross-section (not to scale) along d-d shown in FIG. 6a. FIG. 6c is thus a cross-section through one portion 646 of the fiducial mark in a direction perpendicular to that shown in FIG. 6a.

The laser chip is a photonic device. It has a waveguide 104 defined by a waveguide etch. In this example, the waveguide is a ridge waveguide. Another example of a suitable waveguide for use in embodiments is a buried heterostructure waveguide (not shown).

An optical coupling region 114 is optically coupled to the waveguide and defined by a coupler etch. In this example the coupler etch is a facet etch and the optical coupling region is a region of a waveguide etched facet defined by the facet etch. In another example, further described with reference to FIG. 8, the coupler etch is a grating coupler etch and the optical coupling region is a region of an etched grating coupler defined by the grating coupler etch.

Fiducial mark 640 is configured for alignment of an optical component to the optical coupling region 114. The optical component in this example comprises a photonic integrated circuit. The fiducial mark 640 has a first portion 642, 644 defined by the waveguide etch and a second portion 546 defined by the facet etch. The first portion 642, 644 comprises a pair of elongate shapes, in this example in a broken bar shape, that extend lengthwise along a direction parallel to the waveguide's propagation direction at the optical coupling region. The second portion 646 comprises an elongate shape that extends lengthwise orthogonally with respect to its etch depth and with respect to the waveguide's propagation direction at the optical coupling region. These directions of elongation mean that the fiducial marks have long edges parallel to the waveguide and the etched facet respectively. The long edges can be aligned to accurately by conventional mark-detection systems. Thus the fiducial mark 640 is configured with long edges for alignment of an optical component to the optical coupling region 114 of the etched facet. The waveguide's propagation direction at the optical coupling region is relevant, rather than the waveguide's propagation direction elsewhere, or the direction of the facet. This is because the long edges should be optimally oriented to align to the optical coupling region, even if the waveguide is bent at a point further away from the region, or if the facet is not perpendicular to the waveguide at the region, as may be found in known photonic devices.

In this example the first 642, 644 and second 646 portions of the fiducial mark are arranged together into a plus pattern, with the second portion bisecting the first portion. In another example (not shown), the first and second portions of the fiducial mark are arranged together into an L-shaped pattern. Other patterns may be used that are suitable for alignment during component assembly.

The structure of the fiducial mark 640 is now described in the context of its associated laser chip.

As mentioned above, a first portion 642, 644 of the fiducial mark is defined by the waveguide etch that also defines the waveguide 104. A hard mask broken-bar-shaped pattern (442, 444 in FIG. 4) in a lithographic step defines the first portion of the fiducial mark 640 at the same time as trenches 102, 106 that are etched to define the ridge waveguide 104 in between them.

In subsequent fabrication steps, a patterned hard mask 510 and facet etch defines etched facets 110, 108 at either end of the ridge waveguide 104 and the second portion 646 of the fiducial mark.

With reference to FIG. 6a, in operation, the laser cavity, comprising the waveguide 104 bounded by facets 108 and 110 at either end, outputs optical radiation through an optical coupling region 114. In this example, the optical radiation is output from the optically active layers of the ridge waveguide into the air beyond the etched facet 110.

With reference to FIGS. 6b and 6c, the structure of the fiducial mark 640 will now be described in detail in the context of its wafer-scale fabrication.

The first portion 642, 644 of the fiducial mark 640 is etched by the waveguide etch, along with the trenches 102, 106.

The waveguide etch is split into two stages. A first short part of the waveguide etch is performed to a depth of, for example, 300 nm. A first fiducial protect mask (not shown) is applied and patterned by photolithography to cover and protect the first portion 642, 644 of the fiducial mark 640, but not the trenches 102, 106. The second part of the waveguide etch is performed, while the area of the fiducial mark is protected, etching the trenches (but not the fiducial mark) and stopping on the p-type etch stop layer 124. Then the patterned first fiducial protect mask is stripped. In this way, the first portion 642, 644 of the fiducial mark 640 is formed with an etch depth limited to the depth of the first short part of the waveguide etch, which is less than the depth $d_{RE}$ of the trenches 102, 106 that form the ridge waveguide 104.

Similar to the waveguide etch, the facet etch is split into two stages. A first short part of the facet etch is performed to a depth of, for example, 300 nm. A second fiducial protect mask 610 is applied and patterned by photolithography to cover and protect the second portion 646 of the fiducial mark 640, but not the facet pattern (408, 410 in FIG. 4). The second part of the facet etch is performed, deep through the active layers into the substrate, while the area of the fiducial mark is protected. This longer etch erodes the hard mask 510 in regions 648 not protected by the second fiducial protect mask 610, so it is shown as being thinner than the protected area under the second fiducial protect mask 610. Then the second fiducial protect mask 610 is stripped. In this way, the second portion 646 of the fiducial mark 640 is formed with a second etch depth limited to the depth of the first short part of the facet etch, which is much less than the etch depth $d_{FE}$ of the features (408, 410 in FIG. 4) that define the etched facets 108, 110.

FIGS. 6b and 6c represent the laser chip after the facet etch, but before the second fiducial protect mask 610 is stripped. FIG. 6a represents the laser chip after the second fiducial protect mask 610 is stripped, and does not show the patterned facet etch hard mask 510.

Figure 7:
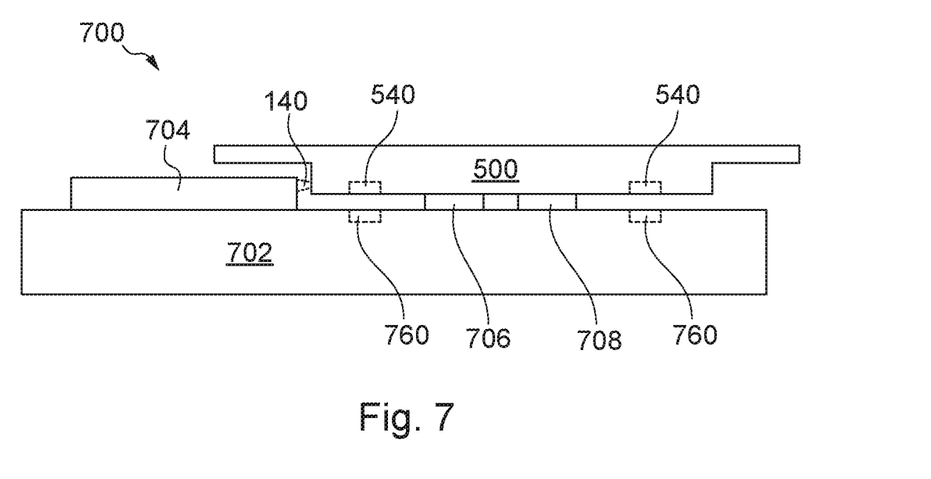
FIG. 7 illustrates, in schematic form, a flip-chip package in accordance with an embodiment of the present invention.

FIG. 7 illustrates another assembled flip-chip package 700, benefitting from the improved alignment afforded by an embodiment of the present invention. The package comprises a laser chip 500 having fiducial marks 540 as described with reference to FIGS. 4 and 5 (or 640 as described with reference to FIG. 6). The laser chip 500 has been inverted, aligned using the fiducial marks 540 and die attached to a silicon photonic integrated circuit (PIC). The PIC has a silicon substrate 702, fiducial marks 760 and an optical component 704. The PIC 702, 704 is attached to the laser chip 500 using solder bumps 706, 708. The optical component 704 is aligned to the optical coupling region of the laser chip 500 using the fiducial marks 540 on the laser chip 500 and the fiducial marks 760 on the PIC 702. Optical radiation 140 output through the optical coupling region in the etched facet of the laser chip is directed to the optical component 704.

Figure 8:
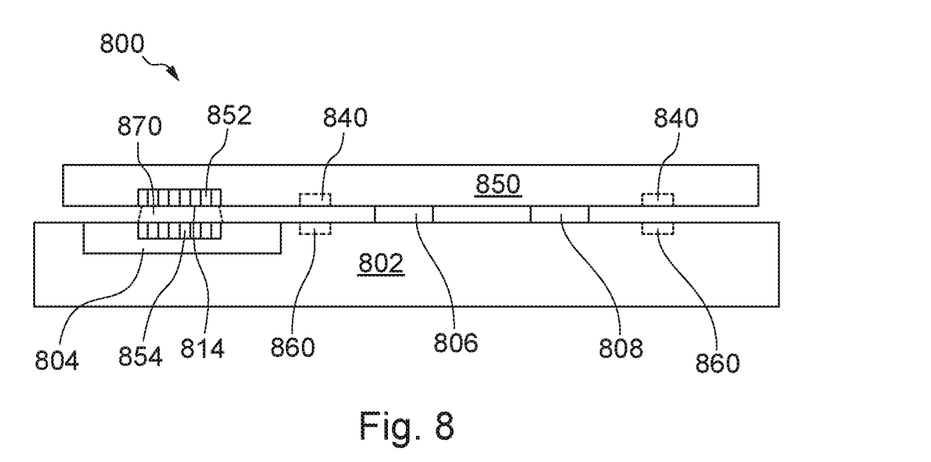
FIG. 8 illustrates, in schematic form, a flip-chip package in accordance with another embodiment of the present invention.

FIG. 8 illustrates an assembled flip-chip package 800, benefitting from the improved alignment afforded by an embodiment of the present invention. The package comprises a laser chip 850 having fiducial marks 840 as described with reference to FIGS. 4 and 5 (or 640 as described with reference to FIG. 6). In this embodiment, the optical coupling region 814 is optically coupled to the waveguide of the laser chip 850, however the optical coupling region 814 is defined by a grating coupler etch, rather than a facet etch. The optical coupling region is thus a region of an etched grating coupler 852 defined by the grating coupler etch. The fiducial mark 840 has a first portion defined by the waveguide etch and a second portion defined by the grating coupler etch.

The laser chip 850 has been inverted, aligned using the fiducial marks 840 and die attached to a silicon photonic integrated circuit (PIC). The PIC has a silicon substrate 802, fiducial marks 860 and an optical component 804. The PIC 802, 804 is attached to the laser chip 850 using solder bumps 806, 808. The optical component 804 is aligned to the optical coupling region 814 of the laser chip 850 using the fiducial marks 840 on the laser chip 850 and the fiducial marks 860 on the PIC 802. Optical radiation 870 output through the optical coupling region 814 in the grating coupler 852 of the laser chip is directed to the optical component 804, where another grating coupler 854 receives the optical radiation 870.

The chips 500, 600 described with reference to FIGS. 4 to 6 have front and back fiducial marks respectively near to the front 110 and back 108 facets. Such an arrangement of fiducial marks also allows the front 110 and back 108 facets of the chip to be aligned to input/output waveguides on the PIC with minimal rotation error, which is particularly useful for example for SOAs or EAMs.

The invention claimed is:

1. A photonic device comprising:
an optically active layer;
an epitaxial layer on the optically active layer;
a waveguide patterned in a first patterning step and defined by a waveguide etch;
an etched facet extending through the epitaxial layer on the optically active layer, the etched facet patterned in a second patterning step and defined by a facet etch, and the etched facet having an optical coupling region optically coupled to the waveguide; and
a fiducial mark configured for alignment of an optical component to the optical coupling region,
wherein the fiducial mark has:
a first portion patterned in the first patterning step and defined by at least a part of the waveguide etch; and
a second portion comprising an edge extending through at least part of the epitaxial layer on the optically active layer, the edge of the second portion patterned in the second patterning step and defined by at least a part of the facet etch.

2. The photonic device of claim 1, wherein the optical component comprises a photonic integrated circuit.

3. The photonic device of claim 1, wherein the waveguide and the first portion of the fiducial mark are formed with a first etch depth, and the second portion of the fiducial mark and a structure comprising the optical coupling region are formed with a second etch depth.

4. The photonic device of claim 1, wherein the waveguide is a ridge waveguide.

5. The photonic device of claim 1, wherein the waveguide is a buried heterostructure waveguide.

6. The photonic device of claim 1, wherein the first portion comprises an elongate shape having a longest edge that in plan view extends lengthwise along a direction parallel to a propagation direction of the waveguide at the optical coupling region.

7. The photonic device of claim 1, wherein the second portion comprises an elongate shape having a longest edge that extends in plan view lengthwise along a direction parallel to the etched facet at the optical coupling region.

8. The photonic device of claim 1, wherein the first and second portions of the fiducial mark are arranged together into a plus-shaped pattern.

9. The photonic device of claim 1, wherein the first and second portions of the fiducial mark are arranged together into an L-shaped pattern.

10. A flip-chip package comprising a first photonic device in accordance with claim 1 and a second photonic device attached to the first photonic device.

11. A method of assembly, the method comprising:
obtaining a first photonic device comprising:
an optically active layer;
an epitaxial layer on the optically active layer;
a waveguide that was patterned in a first patterning step and was defined by a waveguide etch;
an etched facet extending through the epitaxial layer on the optically active layer, the etched facet was patterned in a second patterning step and was defined by a facet etch, and the etched facet having an optical coupling region optically coupled to the waveguide; and
a fiducial mark configured for alignment of an optical component to the optical coupling region,
wherein the fiducial mark has:
a first portion was patterned in the first patterning step and was defined by at least a part of the waveguide etch; and
a second portion comprising an edge extending through at least part of the epitaxial layer on the optically active layer, the edge of the second portion was patterned in the second patterning step and was defined by at least a part of the facet etch;
aligning the first photonic device to a second photonic device using the first and second portions of the fiducial mark; and
attaching the aligned first and second photonic devices together.

12. The method of assembly of claim 11, wherein the second photonic device comprises a photonic integrated circuit.

13. A method of fabrication of a photonic device on a substrate comprising an optically active layer and an epitaxial layer on the optically active layer, the method comprising:
patterning in a first patterning step, and defining by at least a part of a waveguide etch, a first portion of a fiducial mark and a waveguide;

patterning a mask in a second patterning step, a second portion of the fiducial mark and an etched facet; and forming, by at least a part of a facet etch masked by the patterned mask, the second portion of the fiducial mark and the etched facet, wherein the second portion of the fiducial mark is formed with an edge extending through at least part of the epitaxial layer on the optically active layer and wherein the etched facet is formed extending through the epitaxial layer on the optically active layer, the etched facet having an optical coupling region optically coupled to the waveguide, wherein the first and second portions of the fiducial mark are is configured for alignment of an optical component to the optical coupling region.

14. The method of fabrication of claim 13, further comprising applying a fiducial protection mask between first and second parts of the waveguide etch to cover and protect the first portion from the second part of the waveguide etch.

15. The method of fabrication of claim 13, further comprising applying a fiducial protection mask between first and second parts of the facet etch to cover and protect the second portion from the second part of the facet etch.

16. The method of fabrication of claim 13, further aligning the optical component to the optical coupling region, wherein the optical component comprises a photonic integrated circuit.

17. The method of fabrication of claim 13, wherein the waveguide and the first portion of the fiducial mark are formed with a first etch depth, and the second portion of the fiducial mark and a structure comprising the optical coupling region are formed with a second etch depth.

18. The method of fabrication of claim 13, wherein the first portion comprises an elongate shape having a longest edge that in plan view extends lengthwise along a direction parallel to a propagation direction of the waveguide at the optical coupling region.

19. The method of fabrication of claim 13, wherein the second portion comprises an elongate shape having a longest edge that in plan view extends lengthwise along a direction parallel to the etched facet at the optical coupling region.

20. The method of fabrication of claim 13, wherein the first and second portions of the fiducial mark are arranged together into a plus-shaped pattern.

* * * * *